United States Patent [19]

Birch et al.

[11] Patent Number: 5,635,768

[45] Date of Patent: Jun. 3, 1997

[54] GAS TURBINE ENGINE DRIVEN AUXILIARY ELECTRIC POWER UNIT WITH TURBINE SPEED CONTROLLED IN RESPONSE TO GENERATOR OUTPUT CURRENT

[75] Inventors: Peter H. Birch, Horsham; Takeshi Ikeyama; Anthony D. Wearing, both of Brighton; Mark G. Norton, Hove, all of United Kingdom

[73] Assignee: Aisin Seiki Kabushiki Kaisha, Kariya, Japan

[21] Appl. No.: 430,373

[22] Filed: Apr. 28, 1995

[30] Foreign Application Priority Data

Apr. 30, 1994 [GB] United Kingdom ............. 9408678

[51] Int. Cl.$^6$ ............................. H02P 9/04; F02C 9/56
[52] U.S. Cl. ............................. 290/40 C; 290/52
[58] Field of Search ............. 290/40 A, 40 B, 290/40 C, 40 F, 52, 40 R; 322/17, 22, 23, 27, 44, 45; 60/39.2, 39.24

[56] References Cited

U.S. PATENT DOCUMENTS

| | | | |
|---|---|---|---|
| 3,342,999 | 9/1967 | Townsend | 290/40 R |
| 3,764,815 | 10/1973 | Habock | 290/52 |
| 4,219,738 | 8/1980 | Griesinger | 290/40 R |
| 4,309,871 | 1/1982 | Venema | 60/39.281 |
| 4,399,397 | 8/1983 | Kleinschmidt, Jr. | 322/8 |
| 4,421,989 | 12/1983 | Brannstrom | 290/40 R |
| 4,434,613 | 3/1984 | Stahl | 60/39.07 |
| 4,492,874 | 1/1985 | Near | 290/40 B |
| 4,529,887 | 7/1985 | Johnson | 290/40 R |
| 4,959,896 | 10/1990 | Bolin et al. | 290/40 B |
| 5,376,877 | 12/1994 | Kern et al. | 322/32 |

FOREIGN PATENT DOCUMENTS

| | | |
|---|---|---|
| 60187721 | 2/1986 | Japan . |
| 60257795 | 5/1986 | Japan . |
| 1032606 | 6/1966 | United Kingdom . |
| 2141785 | 1/1985 | United Kingdom . |
| 2205207 | 11/1988 | United Kingdom . |

*Primary Examiner*—Steven L. Stephan
*Assistant Examiner*—Christopher Cuneo
*Attorney, Agent, or Firm*—Sughrue, Mion, Zinn, Macpeak & Seas

[57] ABSTRACT

A gas turbine engine driven auxiliary electric power unit which includes a turbine (9), an air compressor (7) for supplying compressed air to the turbine and driven by the turbine, fuel supplying means (2) for supplying gaseous fuel to the turbine, a generator (10) driven by the turbine for generating electrical output power which is fed to a main electric user supply (14), first detecting means (15) for monitoring turbine shaft speed, second detecting means (19) for monitoring the output power of the generator, first modulating means (16,18,13) for modulating the turbine shaft speed to cause it to coincide with a predetermined shaft speed (17) by means of controlling current flow from the generator to the main electric user supply, and second modulating means (20,22,23) for modulating the flow of gaseous fuel which is supplied from the fuel supplying means to the turbine so as to cause the monitored output power to coincide with a predetermined output power (21).

5 Claims, 6 Drawing Sheets

Fig. 6

GAS TURBINE ENGINE DRIVEN AUXILIARY ELECTRIC POWER UNIT WITH TURBINE SPEED CONTROLLED IN RESPONSE TO GENERATOR OUTPUT CURRENT

BACKGROUND OF THE INVENTION

1. Field of the Invention

This invention relates to a control system of a gas turbine engine driven auxiliary electric power unit.

2. Description of the Prior Art

A conventional control system of this kind is disclosed in, for example, U.S. Pat. No. 4,492,874 or U.S. Pat. No. 5,103,629. The gas turbine engine driven auxiliary electric power unit includes a compressor, a turbine and an AC generator which is connected to the turbine through a shaft. The generator is connected to an external power system through an output line. Operation of the gas turbine engine auxiliary electric source unit is directed by a controller. The controller is connected to various sensors of the gas turbine. These sensors monitor various important operating parameters such as temperature, pressure, shaft (rotational) speed and so on. The controller output signals to operational elements of the gas turbine, such as a fuel control and an igniter. As disclosed in U.S. Pat. No. 4,087,961, the fuel control includes a fast acting control valve which controls fuel flow supplied to a combustion chamber for the turbine.

In this gas turbine system, the shaft speed is controlled by means of modulation of the fuel flow by the fast acting control valve of the fuel control. Therefore, in the case when the load is changed and especially when the load is suddenly decreased, the deceleration of the shaft (the gas turbine) by the fuel control does not follow immediately due to slow mechanical response of the gas turbine and fuel control. As a result, the shaft speed increases suddenly and there is a danger the shaft speed temporarily rises to a dangerous or undesirable level. This overspeed phenomenon is a primary concern for the performance of the gas turbine control system.

SUMMARY OF THE INVENTION

It is, therefore, an object of the invention to provide an improved gas turbine engine driven auxiliary electric power unit which overcomes the above drawback.

It is another object of the invention to provide an improved gas turbine engine driven auxiliary electric power unit which can control the shaft speed and the system's output power with relatively cheap components while avoiding the above overspeed phenomenon.

In order to achieve these objectives, there is provided a gas turbine engine driven auxiliary electric power unit which comprises a turbine, an engine compressor for supplying compressed air to the turbine and driven by the turbine, fuel supplying means for supplying gaseous fuel to the turbine, a generator having a shaft and being driven by the turbine for generating output power, first detecting means for monitoring the speed of the shaft, second detecting means for monitoring output power of the generator, first modulating means for modulating the shaft speed in response to a detected shaft speed so as to coincide with a predetermined shaft speed by means of controlling current flow from the generator to the main electric source, and second modulating means for modulating the fuel flow which is supplied from the fuel supplying means to the turbine so as to coincide a detected output power with a predetermined output power.

BRIEF DESCRIPTION OF THE DRAWINGS

Additional objects and advantages of the invention will become more apparent from the following detailed description of preferred embodiments thereof when considered with reference to the attached drawings, in which.

DESCRIPTION OF THE PREFERRED EMBODIMENTS

A control system for a gas turbine engine driven auxiliary electric power unit in accordance with preferred embodiments of the invention will be described with reference to the attached drawings.

Figure 1:
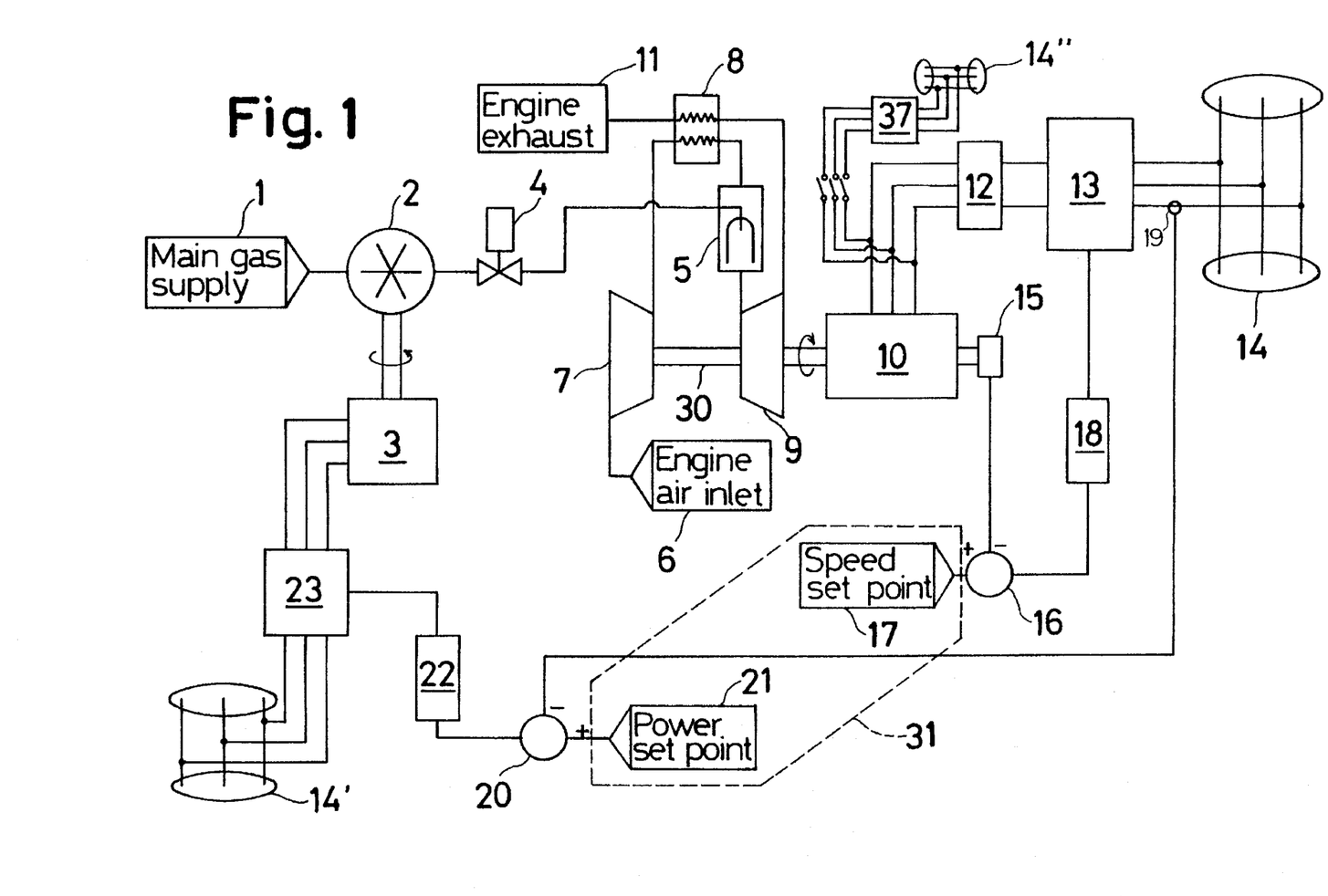
FIG. 1 is a schematic view of a first embodiment of a control system for a gas turbine engine driven auxiliary electric power unit in accordance with the present invention.

Referring first to FIG. 1, a gas turbine engine driven auxiliary electric power unit includes an engine compressor 7, a turbine 9 and a generator 10. In this embodiment the turbine 9 is connected to the engine compressor 7 and the generator 10 through a single shaft 30. The engine compressor 7 is connected to an air inlet 6 for the admission of air for compression, and is connected to a combustion chamber 5 through a heat exchanger 8. In the combustion chamber 5 is an igniter (not shown). The combustion chamber 5 is also fed by a gas compressor 2 which is driven by a motor 3 and which compresses hydrocarbon gas, usually natural gas entering the compressor at low pressure from a mains gas supply 1. The gas which is compressed in the compressor 2 passes into the combustion chamber 5 through a cut-off valve 4. Air which is compressed in the engine compressor 7 and which is preheated in the heat exchanger 8 is combusted in the combustion chamber 5 with the gas. The hot products of combustion pass through the turbine 9 doing work which is supplied to the engine compressor 7 and the generator 10 directly connected thereto, and then pass through the heat exchanger 8 exchanging heat with compressed air. The hot products of combustion then pass to an exhaust 11.

In this embodiment, the generator 10 which is directly driven by the shaft 30 is a three phase permanent magnet alternator, and output power of the generator 10 is fed to the power electronics 13 through a rectifier 12 (a converter) and is supplied to a user circuit 14 as a source of output power. In this embodiment, the power electronics 13 is an industry standard controlled rectifier.

Figure 2:
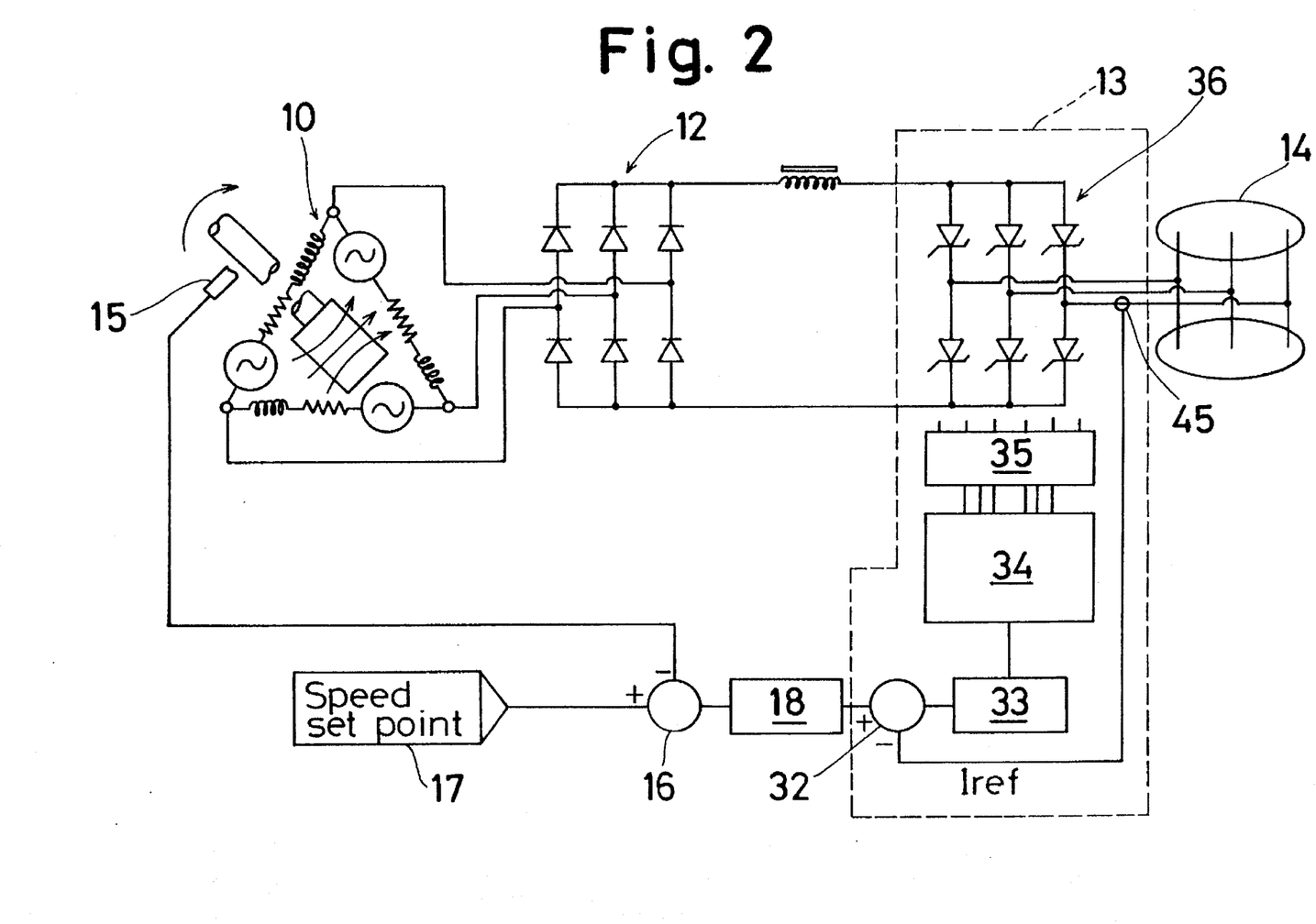
FIG. 2 is a circuit diagram of the first modulating means of the control system of FIG. 1.

Referring to FIG. 1 and FIG. 2, a tachometer 15 is disposed on the shaft 30 for monitoring the current shaft speed. The shaft speed signal from the tachometer 15 is compared in a first comparator 16 with a shaft speed set point 17. An output signal of the first comparator 16 is sent to a first compensator 18, such as a proportional, integral and derivative (PID) device which is connected to a current controller (such as an inverter) within the power electronics 13. The current controller of the power electronics 13 controls the pulse modulation of the power output to the main electric user circuit 14 in response to the output signal of the first compensator 18.

As shown in FIG. 2, the output signal of the first comparator 16 and compensator 18 is compared in a second comparator 32 with a currrent signal Iref which is sent from a power transducer 45. The output signal of the first comparator 16 is a current signal for obtaining a shaft speed the same as the speed set point 17. The power transducer 45 is disposed between the inverter 36 and the main electric user circuit 14 and measures the current which is fed to the main electric user circuit 14. An output signal of the second comparator 32 is sent to a second compensator 33. The second compensator 33 determines from the error signal (the output signal) received from the second comparator 32 what the new output current level from the inverter 36 should be. The new current output level is sent to a control circuit 34. The control circuit 34 which may be analogue or digital determines which devices and what firing angle is required by the inverter 36 in order to supply current to the main electric user circuit 14 commensurate with the present demand for shaft speed and output torque. The control circuit 34 determines the firing sequences necessary for the inverter 36 and sends these signals which may be TTL to the firing circuit 35. The firing circuit 35 is designed to accept the control signals from the control circuit 34 and output the correct gate signals for the inverter 36 which may be transistors, mosfets, IGBT7s or any other type of appropriate semiconductor switching device. Thus electrical power from the d.c. link is thus converted to mains electrical power at the correct amount determined by the feedback control as mentioned above and the speed of the shaft is controlled.

Although the first comparator 16 and the first compensator 18 are shown separately from the power electronics 13, they are normally integrated features for industry standard power electronic drives such as control rectifiers. The speed set point can be a fixed value, be manually set or be generated by other process conditions with analogue or digital circuitry in a controller 31.

A power transducer 19 is disposed in the output line between the power electronics 13 and the main electric source user circuit 14 and measures the output power (current) of the generator 10. The present output signal corresponding to the present output power is compared in a third comparator 20 with the power set point 21. An output signal of the third comparator 20 is sent to a third compensator 22, such as a proportional, integral and derivative (PID) device which is connected to an inverter device 23. The inverter device 23 is interposed between the motor 3 and the main electric source unit and controls the speed of the motor (induction motor) by means of the modulation of the frequency in response to the output signal of the second compensator 22. As well known, the inverter device 23 includes a converter 42 which transforms AC into DC and an inverter 43 which transforms DC into AC.

Figure 3:
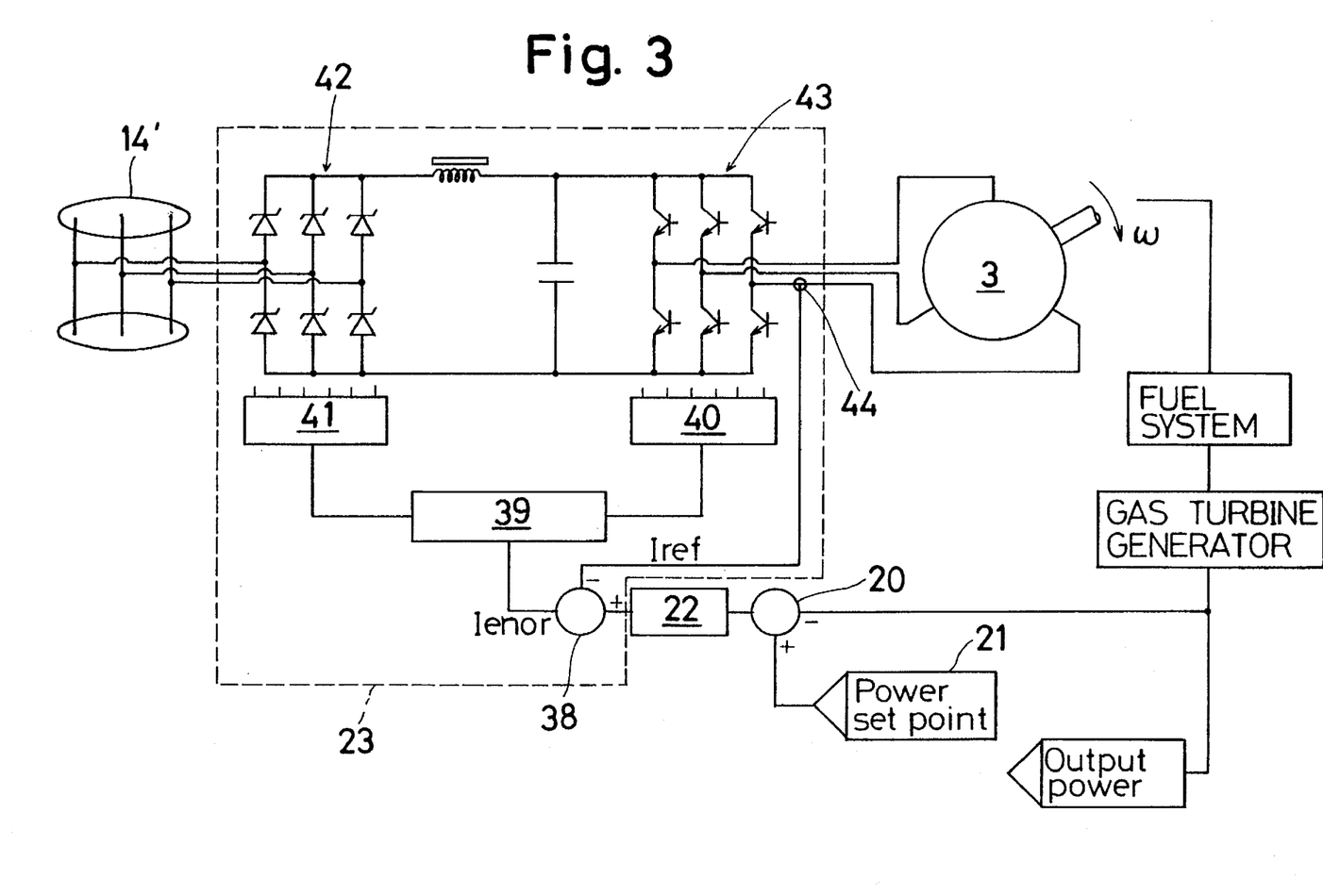
FIG. 3 is a circuit diagram of the second modulating means of the control system of FIG. 1.

As shown in FIG. 3, the output signal of the third compensator 22 is compared in a fourth comparator 38 with a current signal Iref which is sent from the power transducer 44. The power transducer 44 is disposed between the inverter 38 and the motor 3 and measures the current which is fed to the motor 3. However the power transducer 44 may be disposed between the converter 42 and the inverter 43 or between the mains electric supply 14' and the converter 42. An output signal $I_{error}$ of the comparator 38 is sent to a control circuit 39. The control circuit 39 which may be analogue or digital determines what effective voltage and frequency must be synthesized by the inverter 43 in order to supply current to the motor 3 commensurate with present demand for speed and torque. The control circuit 39 determines the firing sequences necessary for the inverter 43 and sends these signals which may be TTL to the firing circuits 40 and 41. The firing circuit 41 is designed to accept the control signals for the converter 42 which may comprise thyristors or any other type of appropriate semiconductor switching device. Electrical power from the mains electric supply 14' is thus inverted at d.c. voltage. The firing circuit 40 is designed to accept the control signals from the control circuit 39 and output the correct gate signals for the inverter 43 which may be transistors, mosfets, IGBTs or any other type of appropriate semiconductor switching device. Electrical power from the d.c. link is thus inverted at an appropriate voltage and a.c. frequency and can therefore modulate the motor speed at the desired frequency.

The third comparator 20 and the third compensator 22 may be integral to the inverter 23 as they are often supplied as standard features or they may be external and separately supplied as in this embodiment. The power output set point can be a fixed value, can be manually set or can be generated by other process conditions with analogue or digital circuitry in the controller 31.

Figure 4:
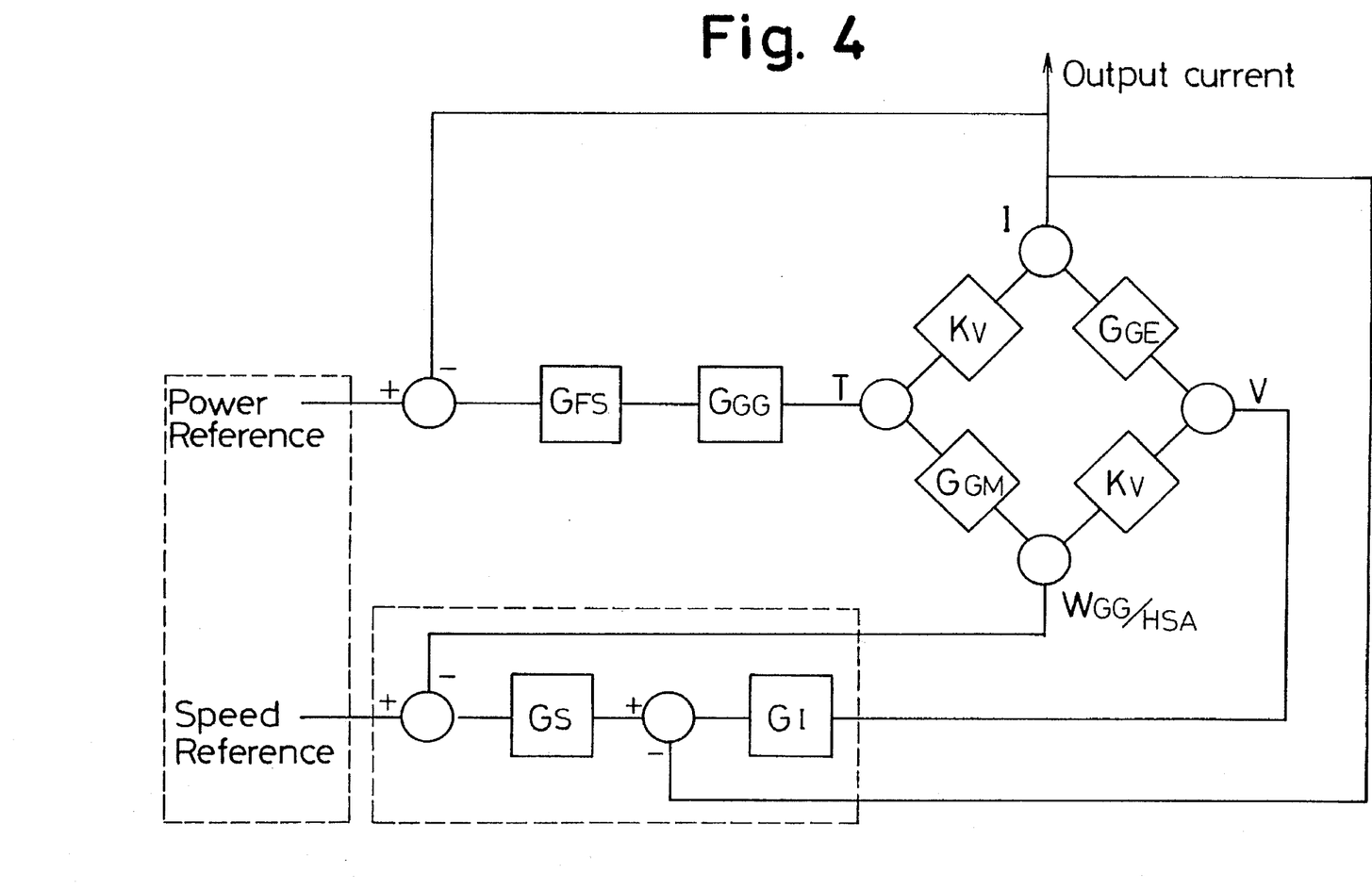
FIG. 4 is a schematic view of the first embodiment which is mathematically shown by the transfer functions.

FIG. 4 shows the connections of the components of the above-described embodiment of the control system for gas turbine engine auxiliary electric source unit which is mathematically shown by the transfer functions. In FIG. 4, each of the transfer functions is as follows:

$G_{FS}$: fuel system transfer function $G_{GG}$: gas turbine transfer function, $G_S$: power electronics speed 'PID' transfer function, $G_I$: power electronics current transfer function ($G_S$ and $G_I$ are integral with the power electronics), $G_{GM}$: electric machine mechanical transfer function, $G_{GE}$: electric machine electrical transfer function, $K_V$: fundamental machine term which has units of Volt/ (rad/sec) and Nm/amps.

The above-described embodiment of the control system for a gas turbine engine auxiliary electric source unit operates as follows. Referring to FIG. 1, for starting the gas turbine engine, the generator 10 is used as a motor driving the turbine 9 and the engine compressor 7 through the shaft 30 by a starter controller 37. The starter controller 37 is a power electronic device and will be smaller than the main power electronics as only around 5~10% of maximum engine power is necessary for starting purposes. Simultaneously, the cut-off valve 4 is opened and the motor 3 of the compressor 2 is driven by the controller (not shown) through the inverter device 23. Thereby, the gas is fed to the combustion chamber 5 and is combusted in the combustion chamber 5 with the air. The hot products of combustion pass through the turbine 9 doing work which is supplied to the engine compressor 7 and the directly connected generator 10 and thereby the gas turbine engine is started.

When the gas turbine engine is started, the output power (current) of the generator 10 which is measured by the power transducer 19 is compared in the third comparator 20 with the power set point 21 and controls the compression of the gaseous fuel through the inverter device 23 until the sensed output power coincides with the power set point 21. Namely, the speed of the motor 3 is controlled by modulating of the frequency of the current which is fed from the mains electric source through the inverter device 23, and the fuel flow is thus controlled to cause the output power to coincide with the power set point 21. For example, when the current output power is lower than the power set point 21, an error signal is sent to the third compensator 22 as an output signal of the third comparator 20 and then an output signal of the third compensator 22 is sent to the inverter device 23. The inverter device 23 increases the frequency of the current which is fed to the motor 3 in response to the output signal of the second compensator 22. Then, when the current output power is higher than the power set point 21, the inverter device 23 decreases the frequency of the current which is fed to the motor 3. Thus the fuel flow to the turbine is controlled so as to cause current output power to coincide with the power set point 21.

Simultaneously, the shaft speed of the generator 10 is measured by the tachometer 15 and is controlled by the power electronics 13 (the inverter) until the current shaft speed coincides with the speed set point 17. Namely, the supply of current fed to the main electric user circuit 14 is controlled by the current controller of the power electronics 13 so as to modulate the effective voltage of the output power. For example, when the present shaft speed becomes lower than the speed set point 17 resulting from an increase of the load, an error signal is sent to the first compensator 18 as an output signal of the first comparator 16, and an output signal of the first compensator 18 is sent to the current controller within the power electronics 13. The current controller of the power electronics 13 shortens the time which the current is fed to the main electric source 14. When the present shaft speed becomes higher than the power set point 21 by the decrease of the load, the error signal is sent to the first compensator 18 as an output signal of the first comparator 16 and then an output signal of the first compensator 18 is sent to the current controller within the power electronics 13. The current controller of the power electronics 13 lengthens the time which the current is fed to the main electric source 14.

As mentioned above, according to this embodiment, the system is provided with two control loops in order to control the output power and the shaft speed. With respect to the control of the shaft speed, since the current is generated virtually instantly by torque in the generator 10 and the electrical response of the current loop within the power electronics 13 is so much faster than the mechanical response of the gas turbine, the shaft speed is prevented from increasing suddenly on a sudden decrease of the load, to an extent that the shaft speed might temporarily have reached into a dangerous domain. Thereby, the gas turbine system safety, durability and reliability are also enhanced.

Furthermore, since the output power of the generator 10 is controlled by the inverter device 23 and the motor 3 and the requirement for a control valve is eliminated, it is able to control the system's output power with relatively cheap components as compared with the prior art.

Figure 5:
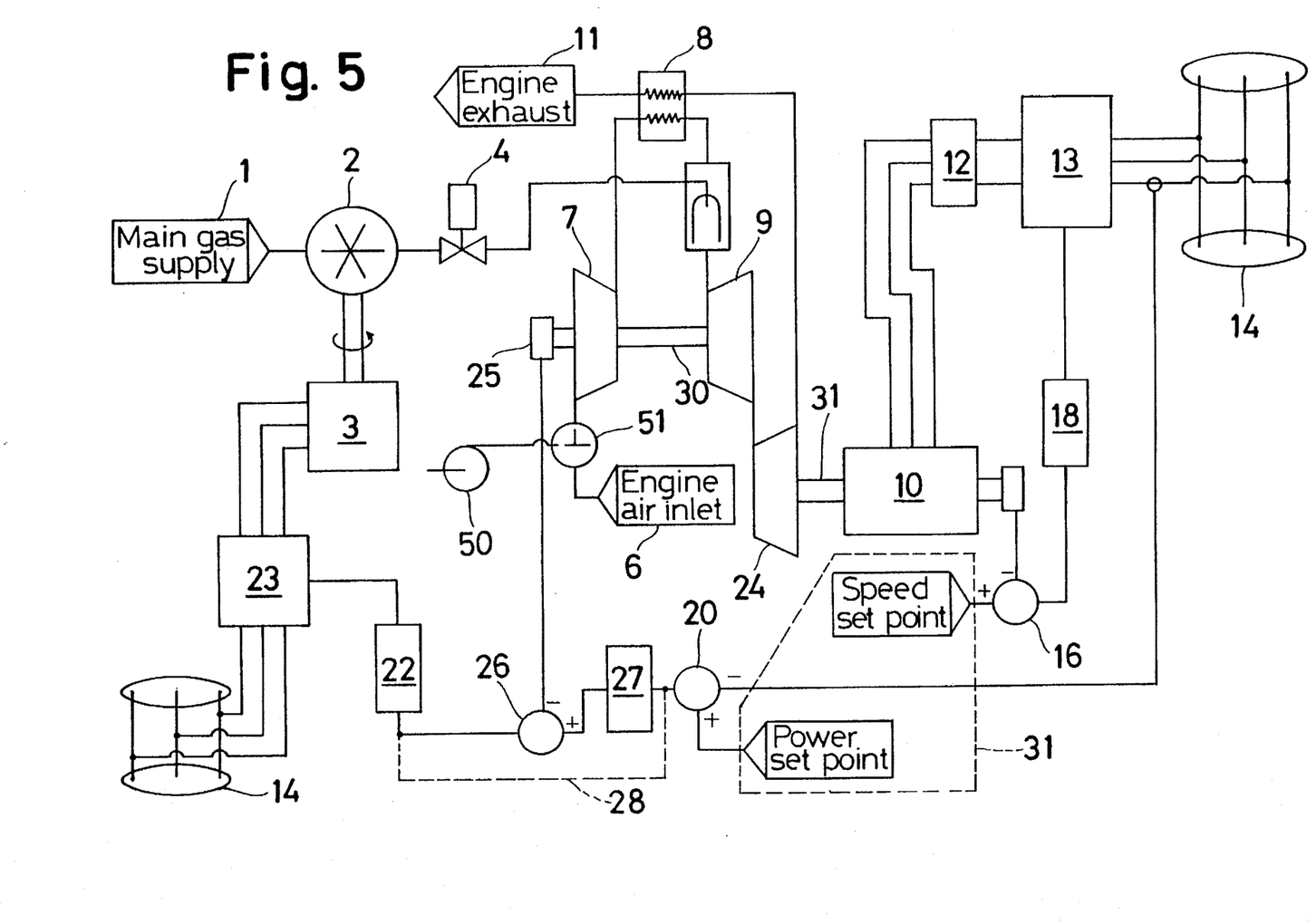
FIG. 5 is a schematic view of a second embodiment of a control system for a gas turbine engine driven auxiliary electric power unit in accordance with the present invention.

FIG. 5 shows a second embodiment of the invention. In FIG. 5, the same parts as those of FIGS. 1 to 3 have been given the same numerals as those utilized in FIGS. 1 to 3. Referring to FIG. 5, the generator 10 is not connected to the engine compressor 7 and the turbine 9 through the same shaft 30, but is connected to a power turbine 24 through a separate shaft 31. The power turbine 24 is driven by the hot products of combustion which are exhausted from the turbine 9, and drives the generator 10. The products of combustion then pass to the exhaust 11 through the heat exchanger 8. A start valve 51 is interposed between the engine compressor 7 and the engine air inlet 6. The start valve 51 has a first position in which the air compressor 7 is fed from the engine air inlet 6 and a second position in which the air compressor 7 is fed from a start blower 50. The start blower 50 supplies the compressed air to the engine compressor 7 through the start valve 51 during starting. In this embodiment, the speed of the shaft 31 is controlled as described previously and a tachometer 25 is disposed on the shaft 30 for monitoring current shaft speed. The current shaft speed signal corresponding to the current speed of the shaft 30 which is measured by the tachometer 25 is compared in a comparator 26 with an output signal of a compensator 27 such as a PID device. The compensator 27 is connected to the comparator 20. An output signal of the comparator 26 is sent to the compensator 22. The purpose of this cascaded control system is to provide a measure of control directly over the speed of the shaft 30 (of the air compressor). Alternatively and rarely, the control loop for the speed of the shaft 30 (the air compressor speed control loop) can be bypassed by a bypass line 28. This embodiment is particularly advantageous because the power electronics control of the shaft 31 of the power turbine 24 provides a powerful braking load to what is otherwise a light inertia shaft. A single shaft system at least has the natural braking of the engine compressor load which rapidly increases with speed providing at least some measure of damping/braking. Since the other structures are the same as the first embodiment, the description is omitted.

Figure 6:
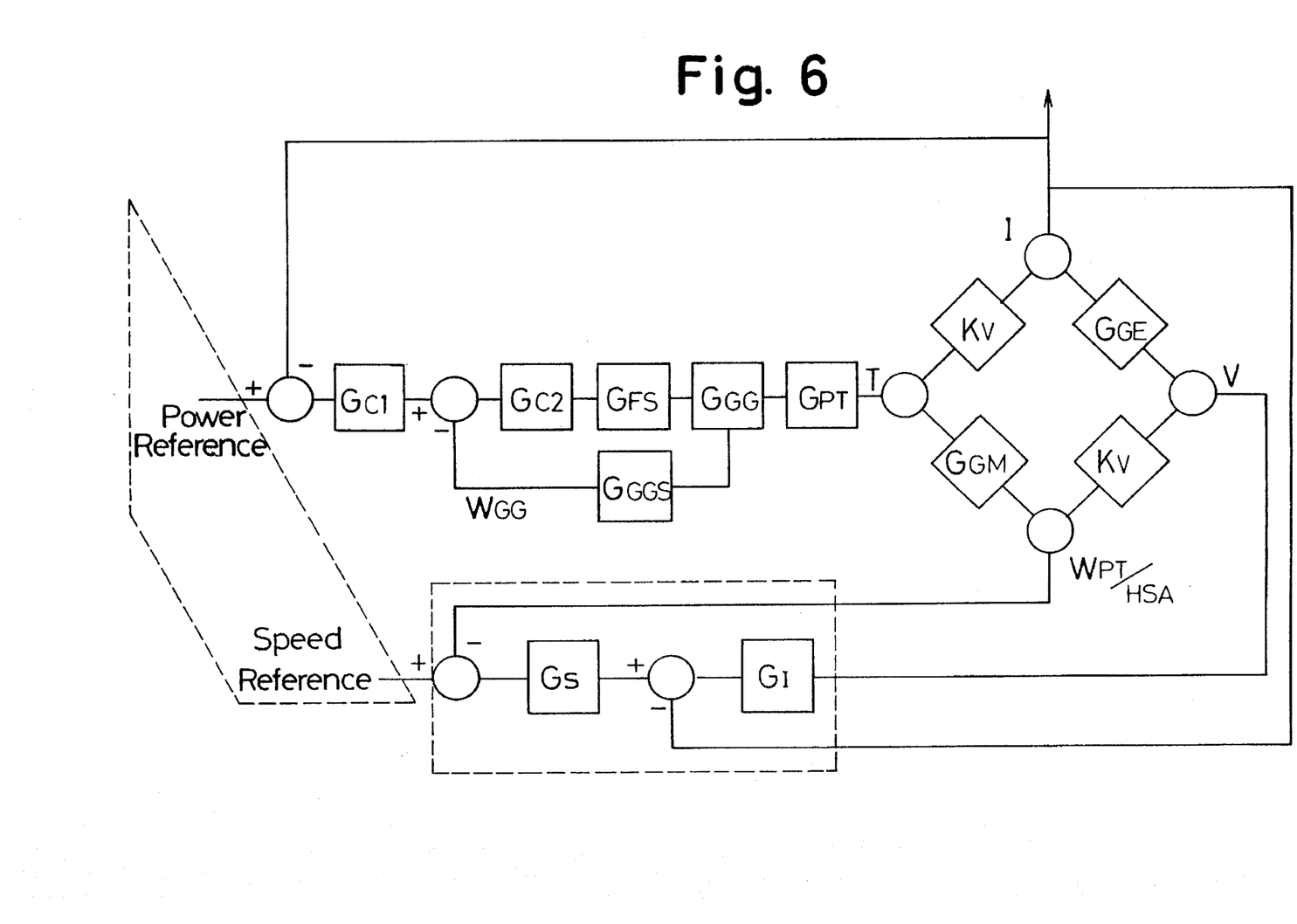
FIG. 6 is a schematic view of the second embodiment wich is mathematically shown by the transfer functions.

FIG. 6 shows the connections of the components of the above-described embodiment of the control system for a gas turbine engine auxiliary electric source unit which is mathematically shown by the transfer functions. In FIG. 6 the same transfer functions as compared with FIG. 4 are used and the same signs utilized as in FIG. 4. In FIG. 6, each of the transfer functions is as follows:

$G_{C1}$: First gas turbine and generator compensator
$G_{C2}$: Second gas turbine compensator
$G_{PT}$: Power turbine transfer function
$G_{GGS}$: Gas generator speed feedback transfer function According to the invention, with respect to the control of the shaft speed, since the current is generated virtually instantly by torque in the generator and the electrical response of the current loop within the power electronics is so much faster than the mechanical response of the gas turbine, overspeed of the system in response to a sudden decrease of the load is prevented. Thereby, the gas turbine system safety, durability and reliability are also enhanced. The power electronics can generally exceed full power by a factor of 2 for many seconds (often 10) or go to 150% full power for 30 seconds (as an example). This means that up to 2× full load torque is available instantaneously for shaft speed control. The system described here relies on the electrical mains as a transient power source and sink in order to keep the speeds under control during load changes. Therefore, by this method of control, excess power available during transient load changes is fed to or from the main supply and is thus diverted from accelerating or decelerating the engine shaft. The power electronics are totally flexible in this respect.

The system so far described, deals with a gas turbine generator system which can only operate in parallel with the main electric source. However, such a system could operate in stand alone mode, i.e. generating to a local self sufficient distribution board. Perhaps two or more generators can be connected in parallel. In order to achieve this so called 'droop' characteristics need to be made similar, i.e. engine speed dropping with new applied load must be compatible with each generator ( to ensure equal load sharing) and the distribution load they feed. Also required are power electronics which synthesize low frequency low voltage 3 phase power, for instance 440 V 50 Mz, with high frequency devices such as IGBTs working at a PWM frequency of 5000 Hz or more. These devices (which will shortly become available as standard packages) will be capable of synchronising with the distribution board already live or if the board is 'dead' at start up. A gas turbine with PWM inverter capable of stand alone operation would have an enhanced response with this system because the droop characteristic could be optimised in the total control system or in the power electronics internal control. Optimisation would be enhanced if either system were digital and programmable. The droop characteristic is further enhanced by the fact that the frequency and voltage is controlled by the power electronics and therefore can be very flexible in tuning the droop characteristic. During even heavy load changes the output voltage and frequency can be kept reasonably steady, the transient energy that is required in the small time that it takes the fuel system to respond can come from the engine and alternator inertia energy which at high speed can be very high (the compressor, turbine and high speed alternator contain significant flywheel energy). As the engine slows down, the alternator voltage which is very high need not drop so low as to reduce the voltage available at the power electronics output end. This would be achieved by design.

We claim:

1. A gas turbine engine driven auxiliary electric power unit comprising:

a turbine, an air compressor for supplying compressed air to the turbine and driven by the turbine, fuel supplying means for supplying gaseous fuel to the turbine, a generator driven by said turbine for generating electrical output power which is fed to a main electric user supply, first detecting means for monitoring turbine shaft speed, second detecting means for monitoring the output power of the generator, first modulating means for modulating the turbine shaft speed so as to bring the shaft speed to a predetermined shaft speed by means of controlling current flow from the generator to the main electric user supply, and second modulating means for modulating the flow of gaseous fuel which is supplied from said fuel supplying means to the turbine so as to cause the monitored output power to coincide with a predetermined output power.

2. A power unit according to claim 1, wherein the generator is connected to the turbine and to the air compressor through a single shaft.

3. A power unit according to claim 1, wherein the generator is connected to a power turbine which is driven by exhaust gases from the turbine.

4. A power unit according to any preceding claim, wherein the generator is an alternator and the first modulating means comprises a rectifier for rectifying output power of the generator, a first comparator for comparing the monitored turbine shaft speed with the predetermined shaft speed, a first compensator for compensating an output signal of the first comparator and power electronics for controlling the rectified output power current flow which is fed to the main electric user supply in response to a compensation signal from the first compensator.

5. A power unit according to claim 4, wherein the fuel supplying means comprises an electric motor driving a compressor, and the second modulating means comprises a second comparator for comparing the monitored output power with the predetermined output power, a second compensator for compensating an output signal of the second comparator and an inverter device for controlling the frequency of electric power driving the motor in response to a compensation signal from the second compensator.

* * * * *